UNITED STATES PATENT OFFICE.

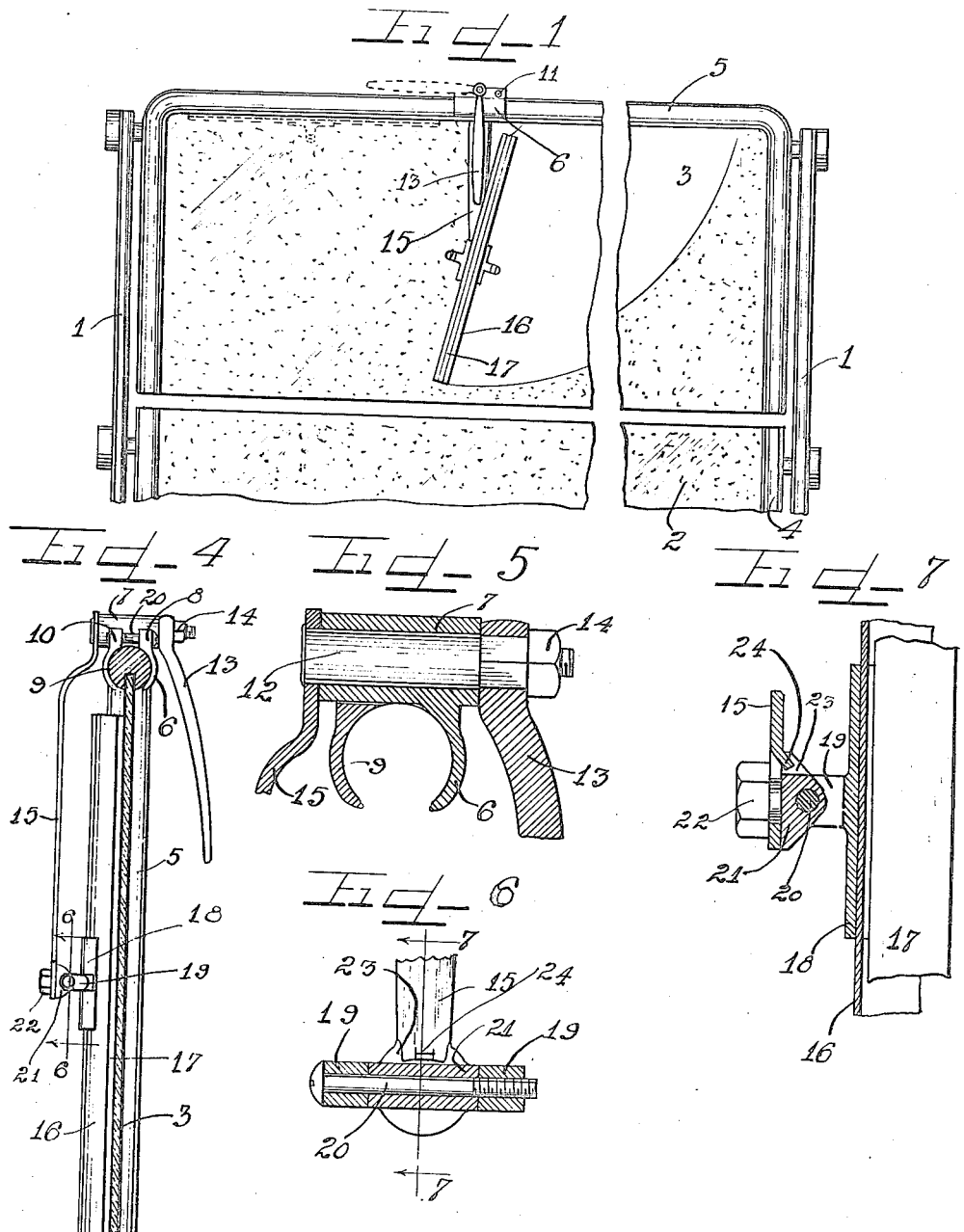

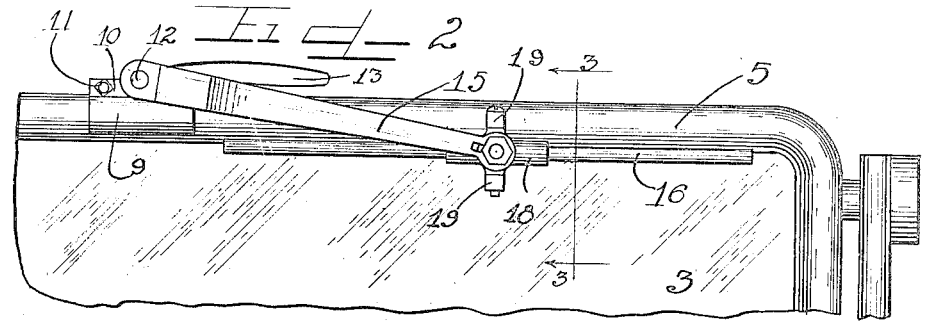
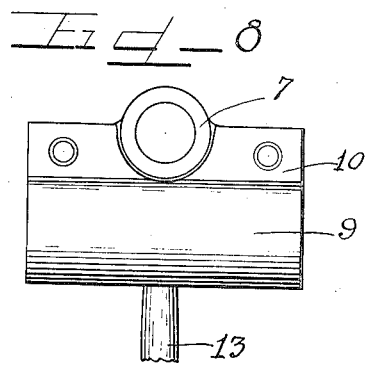
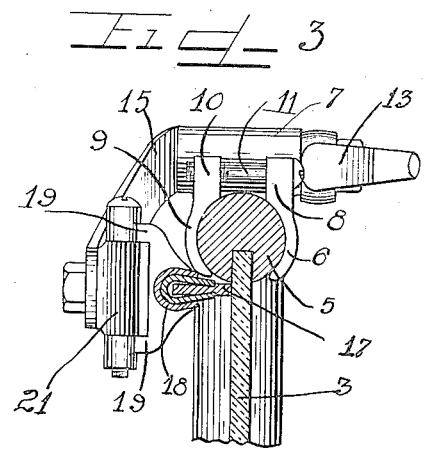
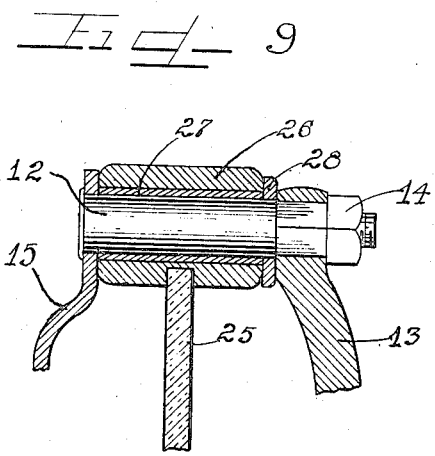
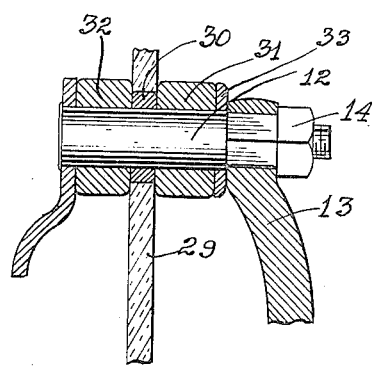

OSCAR H. HICKS AND WILLIAM T. RUSSELL, OF CHICAGO, ILLINOIS; SAID RUSSELL ASSIGNOR TO SAID HICKS.

WIND-SHIELD CLEANER.

1,253,377.   Specification of Letters Patent.   Patented Jan. 15, 1918.

Application filed May 14, 1917. Serial No. 168,452.

*To all whom it may concern:*

Be it known that we, OSCAR H. HICKS and WILLIAM T. RUSSELL, citizens of the United States, and residents of the city of Chicago, in the county of Cook and State of Illinois, have invented certain new and useful Improvements in Wind-Shield Cleaners; and we do hereby declare that the following is a full, clear, and exact description of the same, reference being had to the accompanying drawings, and to the numerals of reference marked thereon, which form a part of this specification.

Many wind shield cleaners designed for use on motor cars are inefficient in operation and extend over the wind shield glass in an unsightly position when not in use, thereby obstructing the vision through the glass. This invention relates to an improved form of wind shield cleaner which is alined close against the wind shield glass frame when not in use in position substantially out of view, and yet when actuated to clear the outer or exposed surface of the wind shield glass, as in stormy weather, operates efficiently over the surface of the glass to clear the same. The cleaner or squeegee member of the device is so mounted that it operates effectually to clean the glass in either direction of movement, thus necessitating only one operation for the purpose, and furthermore, in either of its positions out of use, is disposed in an identical relation with the glass frame out of the range of vision through the glass.

Another important feature of the cleaner is the oblique movement of the cleaner member or squeegee over the surface of the glass, thereby increasing the ease and effectiveness of operation of the device.

It is an object therefore of this invention to construct a cleaner which may be readily mounted upon a wind shield or window for operation from the interior side of the wind shield or window to actuate a resiliently impelled squeegee or cleaner member obliquely across the outer surface of the glass to effectually clear the same.

It is also an object of this invention to construct a wind shield cleaner readily attachable to, and detachable from a wind shield, and operable from the interior side of the wind shield to actuate a cleaner member over the exterior surface of the glass in either direction to clean the same, and in its extreme positions of movement alined out of view closely adjacent the wind shield frame, thereby affording free vision through the wind shield.

It is also an object of this invention to construct a pivoted wind shield cleaner for attachment upon a wind shield or any other transparent member through which clear vision is desired, which, due to the construction of the device, assures positive contact throughout the entire length of the cleaner element over the surface of the glass, the cleaner element automatically assuming an oblique position when moved in either direction, and held closely to the glass by the resilient action of its supporting member.

Other and further important objects of the invention will be evident from the disclosure in the drawings and specification.

The invention (in a preferred form) is illustrated in the drawings and hereinafter more fully described.

On the drawings:

Figure 1 is a fragmentary view of a motor car wind shield equipped with a device embodying the principles of our invention and illustrating the device in position out of use in dotted lines.

Fig. 2 is an enlarged fragmentary view at the upper portion of the wind shield showing the device in position out of use.

Fig. 3 is a sectional detail on line 3—3 of Fig. 2.

Fig. 4 is a vertical sectional detail through the wind shield illustrating the cleaner in position during a cleaning operation.

Fig. 5 is a fragmentary longitudinal section through the attaching clamp of the device.

Fig. 6 is an enlarged sectional detail on line 6—6 of Fig. 4.

Fig. 7 is a sectional detail on line 7—7 of Fig. 6.

Fig. 8 is a side view of the clamp of the device.

Fig. 9 is a sectional detail similar to Fig. 5, illustrating the construction when used with a wind shield having a wooden molding or frame.

Fig. 10 is a similar sectional detail showing the device mounted directly through the glass of a wind shield or window.

As shown in the drawings:

The wind shield shown is of a conventional type used on motor cars, mounted in uprights 1, and comprises a lower pivoted glass section 2, and an upper pivoted glass section 3. The glass of each of the wind shield sections is secured in a peripheral metal channel frame or molding, that for the lower wind shield section 2, denoted by the reference numeral 4, and that for the upper wind shield section by the reference numeral 5. The device is clamped in any desired position upon the upper portion of the frame or molding 5, and embraces a curved clamping jaw 6, having an integral cylindrical bearing member 7, extending transversely at its middle portion, as clearly shown in Fig. 5, and with flat flanged portions 8, on each side of the bearing member 7. Another clamping member 9, is provided, also curved to fit about the molding 5, and having a semicircular recess which fits around beneath the cylindrical portion 7, and with flat flanged portions 10, on each side of the recess positioned opposite to the flanged portions 8, as clearly shown in Figs. 3 and 4, to receive attaching or clamping bolts 11, connected releasably therethrough. Said bolts 11, are fitted slidably through apertures in the flanged portions 8, and engage through threaded apertures in the flanged portions 10, of the clamping member 9, so that when said bolts are tightened up, the clamping members are drawn toward one another in clamping relation upon the wind shield molding.

Journaled through the cylindrical portion 7, of the clamping member 6, is a shaft 12, which, on its inner end, is squared to receive a handle 13, engaged thereon and held attached by a nut 14, which is threaded upon the reduced end of said shaft 12, beyond the squared portion thereof. Secured rigidly upon the outer end of said shaft 12, is a flat curved resilient arm 15, which normally springs inwardly toward the wind shield glass. The cleaner element or squeegee for movement over the exterior surface of the glass consists of a channel 16, with a strip of rubber or other suitable material 17, secured therein to afford a wiping or cleaning member for contact with the surface of the glass. Brazed or otherwise secured upon the channel member 16, slightly below the middle thereof, referring to Fig. 4, is a short rounded channel or bracket member 18, having laterally extending arms 19, on each side thereof. Engaged through and between said arms 19, as clearly shown in Fig. 6, is a pintle 20, which extends through a pivot member 21, disposed between said arms 19, and provided with a stud extension which extends through an aperture in the lower end of the resilient arm 15. A nut 22, is engaged on the end of said stud extension to hold the pivot member and squeegee cleaner element attached upon the lower end of said arm 15. These mechanisms form substantially a universal joint connection for the squeegee cleaner element upon the lower end of the resilient arm. Said pivot member 21, is provided with a radial notch or groove 23, as shown in Figs. 6 and 7, and extending thereinto is a downwardly bent tongue or projection 24, struck from the arm 15, which serves to limit the extent of pivotal adjustment of the pivot member 21, and its associated mechanism into oblique position with reference to said arm 15.

In the modified form of device illustrated in Fig. 9, we have shown a section of a wind shield denoted as a whole by the reference numeral 25, and provided with a molding 26, of wood or other material, through which a hole has been drilled, and a bushing 27, fitted therein. The shaft 12, of the previous construction described, is fitted through said bushing with the arm 15, on one end thereof, and with a washer 28, beneath the handle 13, on the other end of said shaft.

In the modified form of device shown in Fig. 10, we have illustrated an adaptation particularly designed for closed cars wherein an aperture is provided through the glass 29, itself, and with a ferrule 30, of rubber or other material, fitted into said aperture through which the shaft 12, of the device extends. Disposed on each side of the glass 29, are washers 31 and 32, respectively, preferably of soft rubber, though other material may be used, and the same are clamped securely against the surfaces of the glass by the compression of a washer 33, beneath the handle 13, of the device, which is mounted on the shaft 12.

The operation is as follows:

The device, when in position out of use, may be in either one of its two extreme positions, one of which is shown in Fig. 2, in full lines, and in dotted lines in Fig. 1. That is, the cleaner or squeegee element consisting of the rubber strip 17, within the channel 16, is held closely along the wind shield molding 5, parallel thereto. The frictional effect of the squeegee upon the glass under the stress of the resilient arm 15, serves to hold the same in any position of adjustment. The handle 13, is likewise in a corresponding parallel position on the interior side of the wind shield, as shown in dotted lines in Fig. 1.

When it is desired to clear the outer surface of the wind shield of rain, sleet, snow, or other accumulation thereon, the handle 13, on the interior side of the wind shield is operated from the position shown in dotted lines in Fig. 1, pivotally about the attaching bracket 6—9, into its other corresponding position, thus causing a pivotal swinging movement of the resilient arm 15, across the outer surface of the wind shield. Owing to the slightly eccentric connection of the squeegee 16—17, to the lower end of the resilient arm 15, the drag effect upon the squeegee causes the same to assume an oblique position in its travel across the wind shield, that is, with the lower or outer end of the squeegee element leading. Due to the oblique movement of the squeegee across the glass, very little resistance is offered to adjustments of the device, and it may be operated at all times with ease. This is particularly true when the surface of the glass has been wet with rain or snow. The extent or angle to which the squeegee element is allowed to drag as it is operated across the glass by the resilient arm 15, in assuming its oblique position is determined by the movement of the tongue or projection 24, in the slot 23, of the pivot member 21. The extent of oblique movement of the squeegee permitted is sufficient to allow the squeegee to swing into parallel position out of view when out of use, beneath the wind shield molding, as shown in Fig. 2.

In operating the device, the first movement imparted to the arm 15, by the handle 13, on the interior side of the wind shield will cause the outer end of the squeegee element to lead ahead of the arm 15, so that the other end of the squeegee element swings to the opposite side of said arm, and presents the squeegee edge 17, obliquely to the path of its movement across the glass. The resiliency of the arm 15, holds the squeegee firmly pressed inwardly against the outer surface of the glass, and this spring stress of the arm is resisted by the shaft within the long bearing member 7, of the bracket, so that the handle 13, may be freely operated on the interior side of the wind shield without necessitating contact with the glass to brace the same against the spring stress of the arm 15. Owing to the universal pivotal connection of the squeegee member 16—17, on the end of the arm 15, flat contact of the squeegee cleaner element against the outer surface of the glass is assured at all times. The adjustability of the clamping members 6 and 9, upon the clamping bolts 11, permits adaptation to wind shields having moldings of different size, but in general the moldings are substantially standard and only a slight range of adjustment is necessary.

We are aware that various details of construction may be varied through a wide range without departing from the principles of this invention, and therefore do not purpose limiting the patent granted otherwise than necessitated by the prior art.

We claim as our invention:

1. In a device of the class described, a shaft, a handle on one end thereof, a resilient member on the opposite end of said shaft, a squeegee member, a bracket rigidly secured thereto having oppositely disposed arms, a pivot pin connecting the arms and a pivot member pivoted on said pin between the arms and pivotally connected to the resilient member.

2. In a device of the class described, a shaft, a handle on one end thereof, a resilient member on the opposite end of said shaft, a squeegee member, a bracket rigidly secured thereto having oppositely disposed arms, a pivot pin connecting the arms, a pivot member pivoted on said pin between the arms and pivotally connected to the resilient member said pivot member having a radial groove therein and a tongue struck from the resilient member engaging in said radial groove.

3. In a wind shield cleaner, a bracket, a shaft journaled therein, a handle on one end of the shaft, a resilient bar secured to the opposite end of the shaft, a member pivotally secured to said bar, a coacting slot and tongue on the pivot member and bar to limit the relative movement between the same, a pintle pivoted to the pivot member, a bracket secured to the pintle and a squeegee member rigidly secured to the bracket.

In testimony whereof we have hereunto subscribed our names in the presence of two subscribing witnesses.

OSCAR H. HICKS.
WILLIAM T. RUSSELL.

Witnesses:
Le Roy D. Kiley,
Earl M. Hardine.